United States Patent [19]
Shimada

[11] Patent Number: 5,548,690
[45] Date of Patent: Aug. 20, 1996

[54] PRINTING APPARATUS

[75] Inventor: Yasuo Shimada, Nagoya, Japan

[73] Assignee: Brother Kogyo Kabushiki Kaisha, Nagoya, Japan

[21] Appl. No.: 54,216

[22] Filed: Apr. 30, 1993

[30] Foreign Application Priority Data

Jul. 24, 1992 [JP] Japan ................................ 4-218290

[51] Int. Cl.$^6$ .................................................. G06F 15/00
[52] U.S. Cl. .................................... 395/112; 395/102
[58] Field of Search .................................. 395/112, 101, 395/102, 109, 110, 114, 150, 151, 117; 347/142, 240, 251, 254, 261; 346/108, 154; 358/296, 462, 447, 448, 451, 525, 428; 382/298, 299, 300

[56] References Cited

U.S. PATENT DOCUMENTS

| | | | |
|---|---|---|---|
| 4,847,641 | 7/1989 | Tung | 346/154 |
| 5,005,139 | 4/1991 | Tung | 395/101 |
| 5,008,752 | 4/1991 | Van Nostrand | 358/462 |
| 5,045,869 | 9/1991 | Isaka et al. | 346/108 |
| 5,124,802 | 6/1992 | Ito et al. | 358/298 |
| 5,157,417 | 10/1992 | Anzai | 346/108 |
| 5,235,436 | 8/1993 | Sakamoto et al. | 358/462 |
| 5,301,037 | 4/1994 | Kang et al. | 358/451 |
| 5,327,257 | 7/1994 | Hrytzak et al. | 358/447 |

*Primary Examiner*—Raymond J. Bayerl
*Assistant Examiner*—Dov Popovici
*Attorney, Agent, or Firm*—Oliff & Berridge

[57] ABSTRACT

An interpolation dot generating circuit having a determination circuit, a selecting circuit, and interpolation data A for 300 dpi and the interpolation data B for 600 dpi. A one of the interpolation data A or B is selected based on a signal output from a selection switch which shows a resolution of 300 dpi or 600 dpi. If interpolation dot data is generated from the interpolation data A or B, selected by the determination circuit, the dot data from the line memory and the generated interpolation dot data are output to the data selector. The data selector outputs image information VDO based on the dot information and the interpolation dot data output thereto. Therefore, a printing output with higher-quality can be obtained since a high dot density and high-level gradation in compliance with the preset resolution is produced. As a result, a nicely appearing and accurate image can be recorded.

16 Claims, 4 Drawing Sheets

PRINTING APPARATUS

BACKGROUND OF THE INVENTION

1. Field of the Invention

The invention relates to a printing apparatus, more specifically, to a printing apparatus generating interpolation data which interpolates dot data to obtain a high-quality printing output.

2. Description of Related Art

In laser printers, interpolation dot data generated from dot data is output for the purpose of high dot density and high-level gradation to produce a higher-quality printing output. The interpolation dot data has a higher dot density than the dot data, that is, a dot of the interpolation dot data is smaller than that of the dot data for interpolating the jagged outline of the characters to be output.

In a laser printer capable of carrying out both a printing operation with low resolution (300 dpi) and a printing operation with high resolution (600 dpi) alternatively, the common interpolation dot generating means, for both printing operations with low resolution and the high resolution, comprises one chip of LSI which is used to generate interpolation dot data for both the low resolution and high resolution printing.

However, a nice appearing and accurate printing output for both resolutions cannot be obtained because the common interpolation dot generating means is used to generate the interpolation dot data for both the low resolution printing and the high resolution printing in the above-described laser printer.

Usually, toner particles and the photosensitive drum intended for printing at 300 dpi have been used for printing both 300 dpi and 600 dpi and the interpolation dot generating means of 300 dpi has been most commonly used when both interpolation dot data for 300 dpi and for 600 dpi are generated. As a result of using the common interpolation dot generating means, the problems described below are encountered.

In printing with the low resolution of 300 dpi, interpolation data X is generated by the interpolation dot generating means to interpolate the jagged outline of the characters to be output. Even if the jagged outline is interpolated appropriately by the interpolation data X, there occurs a problem that a nice appearing printing output cannot be obtained when printing in the high resolution of 600 dpi using the interpolation data X.

That is, in the above-described printer used with toner particles and the photosensitive drum intended for printing at 300 dpi, when such toner particles, for 300 dpi, are used in printing with the high resolution of 600 dpi, it becomes difficult to print dots of a high density because the particle diameter of the toner particles for 300 dpi is larger than desirable for printing with 600 dpi. Further, the photosensitive drum intended for the low resolution of 300 dpi may not accept the irradiation light for printing dots of high density, that is the photosensitive drum for 300 dpi may not be sensitive enough to the irradiation light for printing at 600 dpi. Therefore, the photosensitive drum is not charged precisely and accurately and the quality of the printing output cannot be appropriately improved as would be expected with this increased dot density.

In addition, if the interpolation data generating means for 300 dpi generates the interpolation data for 600 dpi, there are problems as described below and the quality of a printing output is not appropriately improved.

As shown in FIG. 5, dot data 40 of 4 dots in the vertical direction and 8 dots in the horizontal direction is generated at the low resolution of 300 dpi. The interpolation data 42 of the dot data 40 is generated by the interpolation data generating means for 300 dpi.

As shown in FIG. 6A, dot data 46 of 4 dots in the vertical direction and 8 dots in the horizontal direction is generated at the high resolution of 600 dpi in the same way as in the case of 300 dpi. The interpolation data 48 of the dot data 46 is generated by the interpolation data generating means of 300 dpi in the same way that the interpolation data 42 of the dot data of 300 dpi is generated. However, if the interpolation data 48 is generated by the interpolation data generating means in the same way that the interpolation data 42 is generated, extra interpolation data might be generated or necessary interpolation data may not be generated.

Therefore, there has been a problem that a printing output is not improved appropriately. For example, as shown in FIG. 6B, the interpolation dot data 48E generated as the interpolation dot data 48 of the dot data 46 of 600 dpi is an extra interpolation dot data that is not needed. On the other hand, in addition to the interpolation dot data 48 of 600 dpi generated by the interpolation dot data generating means of 300 dpi, the interpolation dot data 48N is necessary to obtain a beautiful printing output. However, the interpolation dot data 48N is not generated by the interpolation dot data generating means of 300 dpi. Therefore, there has been a problem that the quality of the printing output is not improved appropriately.

Further, if the above-described printer has interpolation dot data generating means of 600 dpi which is used for generating both interpolation dot data of 600 dpi and 300 dpi instead of the interpolation dot data generating means of 300 dpi, the interpolation dot data of 600 dpi is capable of improving the jagged outline of the character of 600 dpi but when it is used for printing at the low resolution of 300 dpi, there are problems noted as follows. Similar to the problems with the interpolation dot data generating means of 300 dpi, in some instances extra dot data will be generated and printed and in other instances necessary dot data will not be generated and printed so that a nice and accurate image cannot be obtained. For example, the character becomes thick or an edge of the character is rounded off.

SUMMARY OF THE INVENTION

An object of the invention is to provide a printing apparatus that is capable of producing a printed output having higher-quality by controlling the density of the dots and the gradation level according to the desired resolution.

In order to achieve the above object a printing apparatus capable of printing with a plurality of resolutions comprises:

receiving means for receiving dot information of an image input from a host computer;

first storing means for storing the dot information received by said receiving means;

second storing means for storing a plurality of interpolation data of the plurality of resolutions;

selecting means for selecting one of the plurality of interpolation data according to a one of the plurality of resolutions; and interpolation dot information generating means for generating interpolation dot information from the dot information stored in said first storing means according to the interpolation data selected by said selecting means.

In the above-structured printing apparatus, the receiving means receives dot information of an image input from the host computer, the first storing means stores the dot information received by the receiving means, the second storing means stores a plurality of interpolation data for the plurality of resolutions, the selecting means selects one of the plurality of interpolation data according to a one of the plurality of resolutions, and the interpolation dot information generating means generates interpolation dot information from the dot information stored in the first storing means according to the interpolation data selected by the selecting means.

As is clear from the explanation above, since the interpolation dot information generated by the interpolation dot information generating means is controlled according to a dot density of a one of the plurality of resolutions, the interpolation dot information according to the dot density of the desired resolution can be selected and an appropriate interpolation be made. Therefore, a high density of dots and a high-level of gradation can be obtained to record nice appearing and accurate images. As a result, the print quality improves.

BRIEF DESCRIPTION OF THE DRAWINGS

A preferred embodiment of the invention will be described in detail with reference to the following figures wherein.

DETAILED DESCRIPTION OF THE PREFERRED EMBODIMENT

A preferred embodiment of the invention explained by referring to the accompanying drawings.

Figure 1:
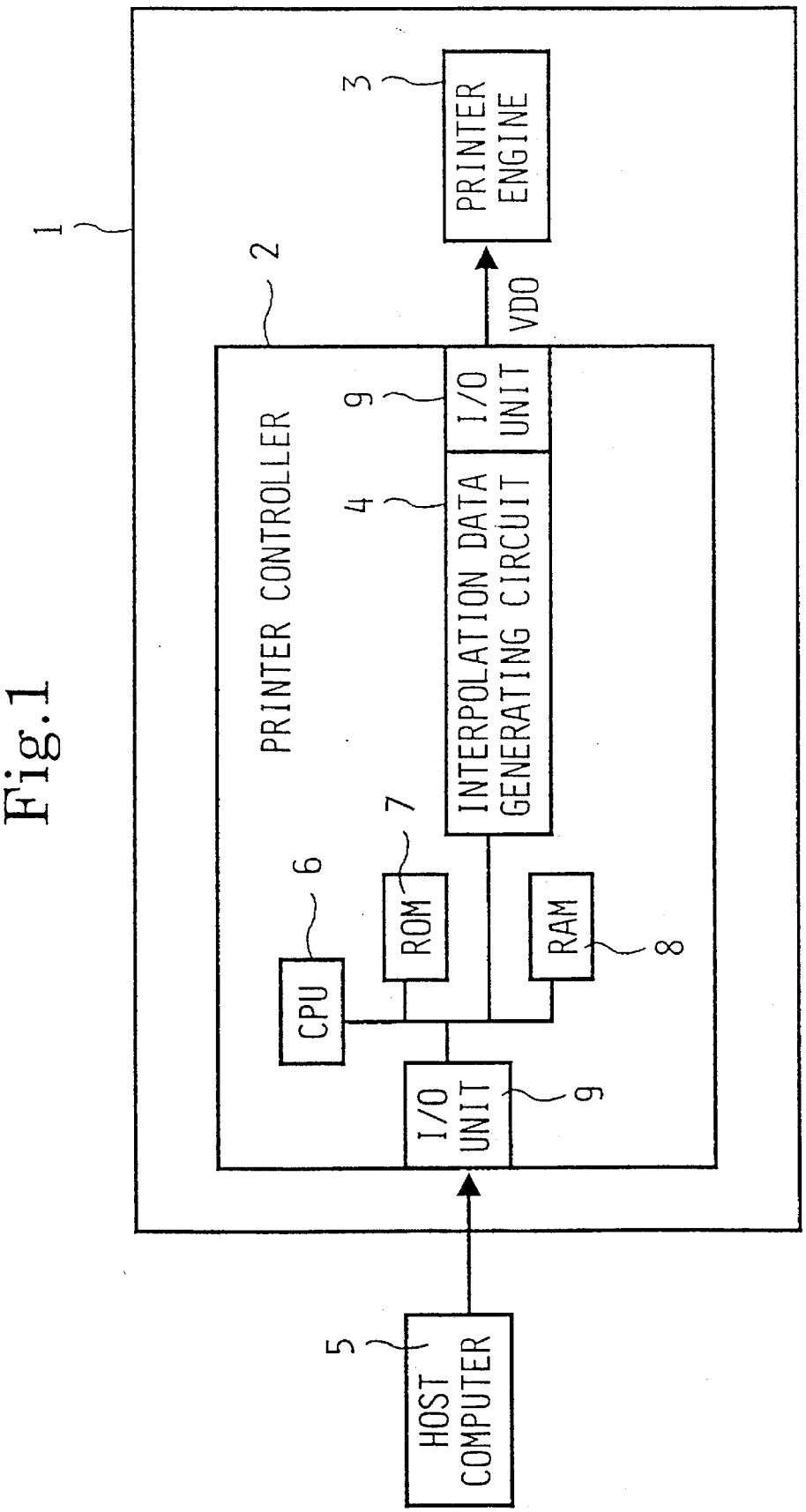
FIG. 1 is a block diagram of the laser printer of the embodiment of the invention.

First, a laser printer system is explained referring to FIG. 1. A laser printer 1 comprises a printer controller 2 of the arithmetic logic operation circuit having CPU 6, ROM 7, RAM 8, and I/O unit 9 and a printer engine 3 for carrying out a printing operation on paper.

A host computer 5 inputs the printing data, the printer engine 3 and an interpolation data generating circuit 4 are connected with the I/O unit 9. The printer controller 2 generates image information VDO (Video Data Output that is equivalent to printing data) based on the character codes, input from the host computer 5, by executing predetermined processing.

Figure 2:
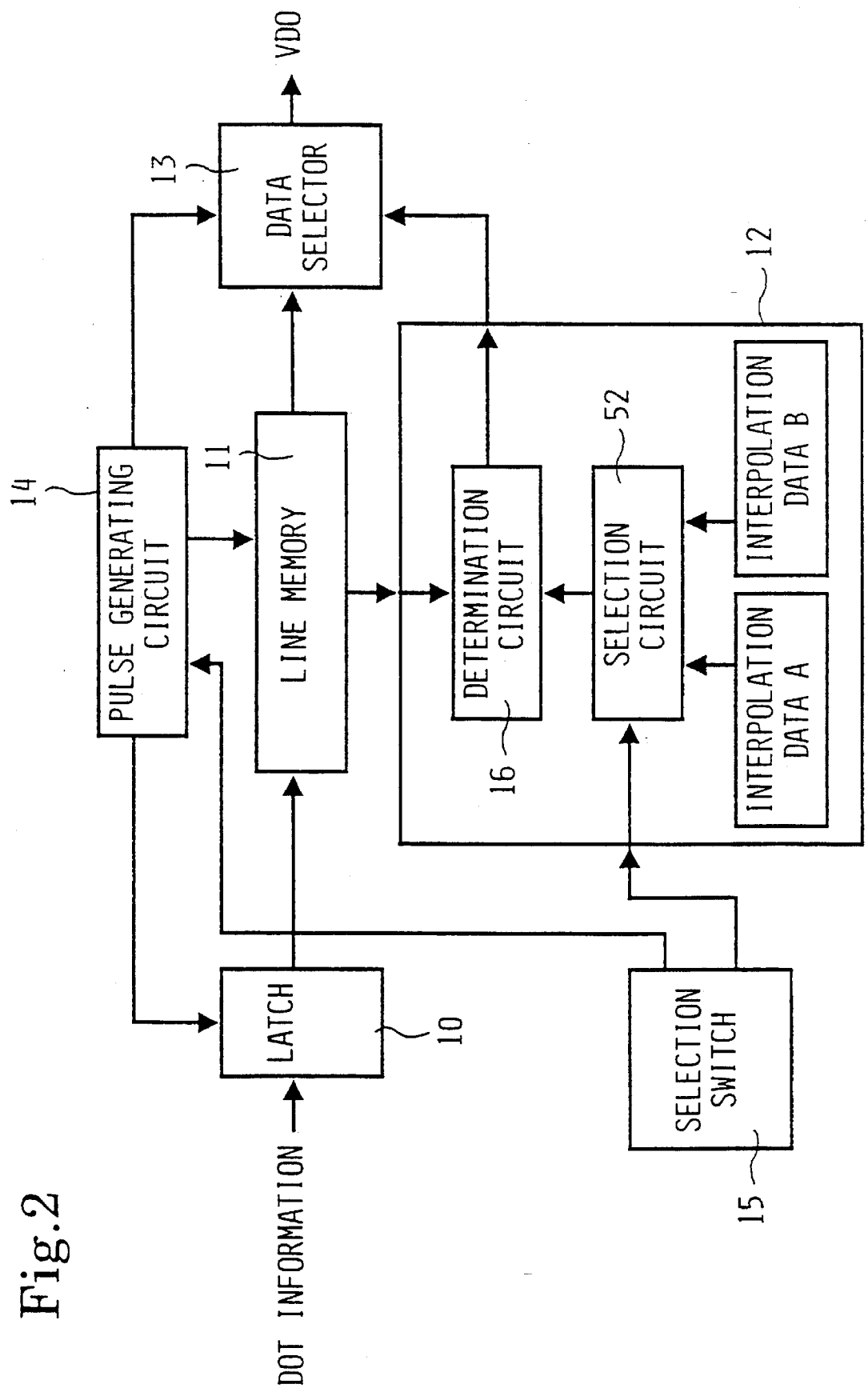
FIG. 2 is a block diagram of the interpolation data generating circuit of the embodiment.

ROM 7 stores the processing program for generating image information VDO and a program for checking the dot density of the dot data corresponding to the character codes output from the host computer 5 and for selecting the interpolation dot generating circuit 12 (refer to FIG. 2).

The printer engine 3 prints an image on a paper based on the image information VDO generated by the printer controller 2. The interpolation data generating circuit 4 connects the printer controller 2 and the printer engine 3 of the laser printer 1 via I/O unit 9. The interpolation dot data generating circuit 4 is incorporated as a part of the printer controller 2.

Next, the interpolation dot data generating circuit 4 is explained in detail with reference to FIG. 2. The interpolation dot data generating circuit 4 comprises a latch 10, a pulse generating circuit 14, a line memory 11, a data selector 13, an interpolation dot data generating circuit 12 and a selection switch 15.

The latch 10 receives non-interpolated dot data, generated by executing a predetermined processing, from RAM 8. The pulse generating circuit 14 generates a pulse to control the receiving timing of the latch 10, the writing timing and reading timing of the line memory 11 and the output timing of the data selector 13. The line memory 11 is a SRAM (static RAM) for storing dot information received by the latch 10. The dot data stored in the line memory 11 (SRAM) is sent to the interpolation dot data generating circuit 12 to generate interpolation dot data. The selection switch 15 outputs a signal which designates a dot density corresponding to one of the resolutions of 300 dpi or 600 dpi.

The interpolation dot data generating circuit 12 comprises a determination circuit 16, a selection circuit 52, interpolation data A for 300 dpi, and interpolation data B for 600 dpi. The determination circuit 16 determines whether the dot data received from the line memory 11 needs to generate interpolation dot data. If the dot data does not need to generate interpolation dot data, the dot data is sent to the data selector 13.

If the dot data needs to generate interpolation dot data, the selection circuit 52 receives a signal from the selection switch 15. The selection circuit 52 selects either one of the interpolation dot data A of 300 dpi or the interpolation dot data B of 600 dpi based on the signal received from selection switch 15. The determination circuit 16 receives a one of the interpolation data A or B and the dot data from the line memory 11 and generates interpolation dot data according to the received interpolation data and dot data and outputs the generated interpolation dot data to the data selector 13.

The data selector 13 outputs image information VDO based on the dot data from the line memory 11 or the interpolation dot data from the interpolation dot data generating circuit 12.

Examples of a method for generating interpolation dot data is disclosed in U.S. Pat. No. 4,847,641 (Japanese Patent Laid-Open No. 2-112966) which is incorporated into this specification by reference.

Figure 3:
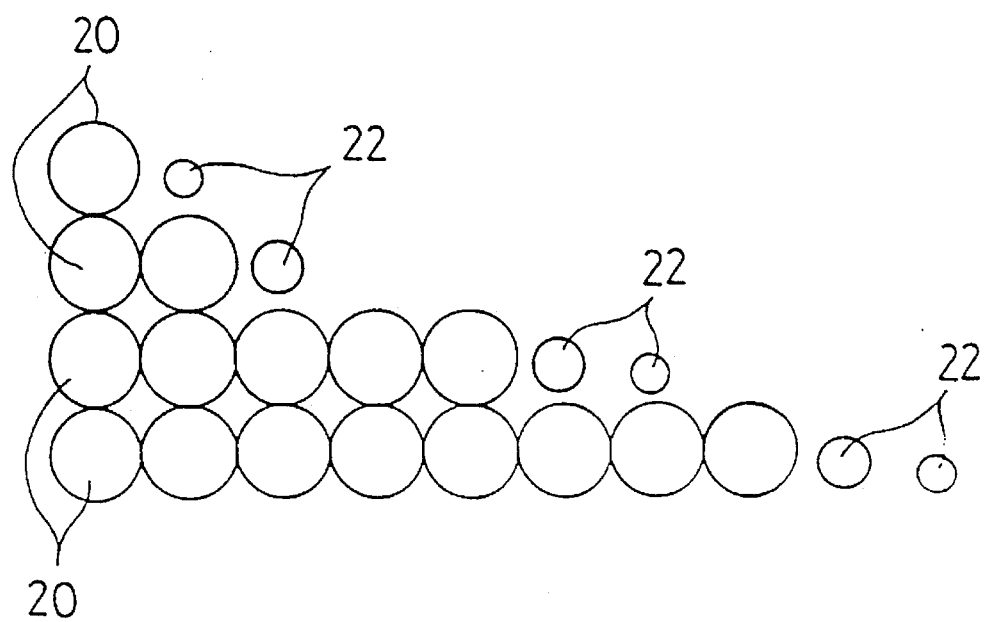
FIG. 3 shows the interpolation dot data of 300 dpi.
Figure 4:
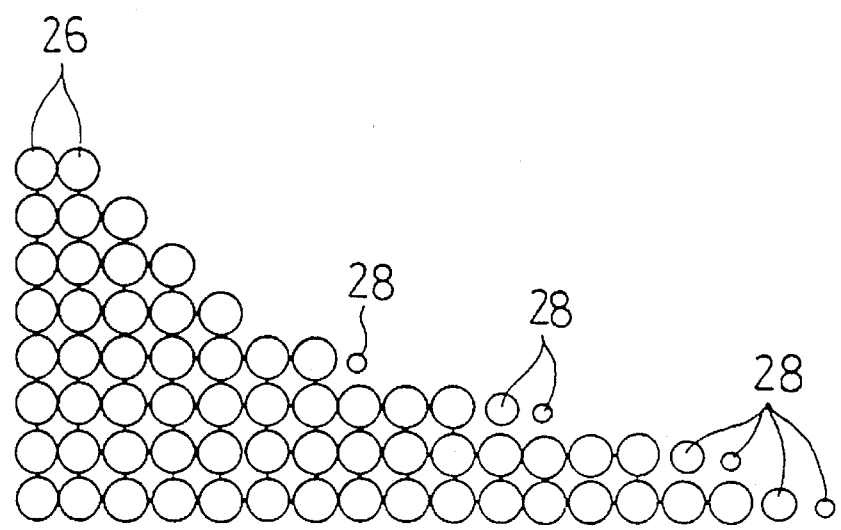
FIG. 4 shows the interpolation dot data of 600 dpi.
Figure 5:
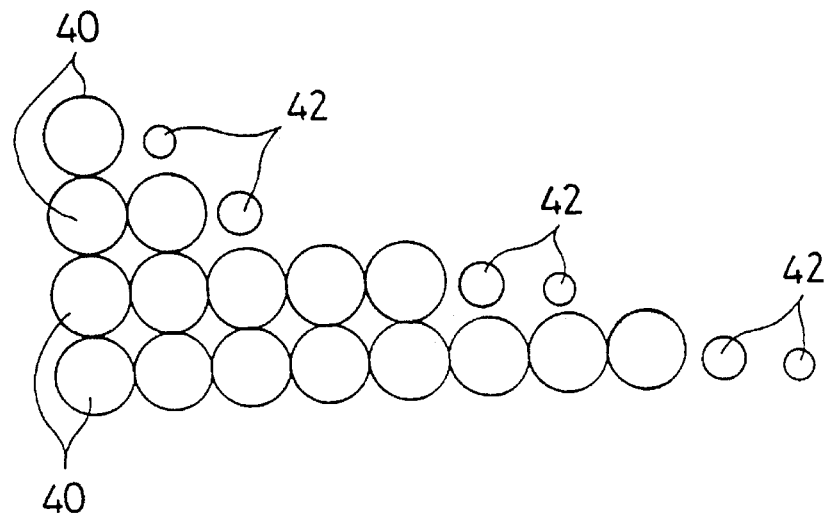
FIG. 5 shows the interpolation dot data of 300 dpi of related art printers.
Figure 6:
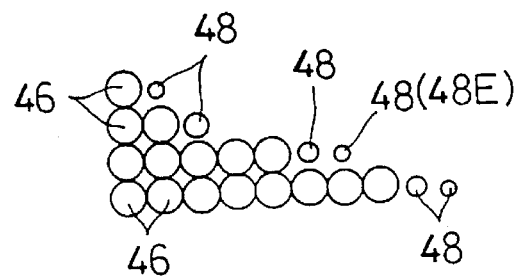
FIG. 6A shows the interpolation dot data of 600 dpi of related art printers.
FIG. 6B shows the interpolation dot data of 600 dpi of related art printers.
Figure 6:
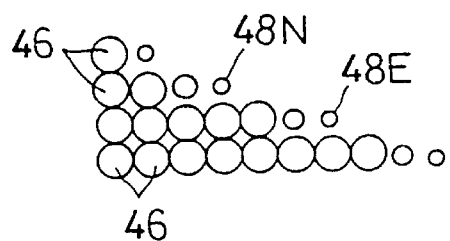

In the embodiment, toner particles and a photosensitive drum for 600 dpi are used. FIG. 3 shows a printing output 20 which is obtained with the low resolution of 300 dpi according to the image information VDOA which is interpolated by the above-described processing based on the interpolation data A. FIG. 4 shows a printing output 26 which is obtained with the high resolution of 600 dpi according to the image information VDOB which is interpolated by the above-described processing based on the interpolation data B.

Because the output results 22 and 28 obtained based on the interpolation data A and the interpolation data B respectively are printed on paper in addition to the output results 20 and 26 based on the dot data, a high dot density and a high-level gradation can be achieved.

As is clear from the above explanation, since interpolation dot data according to the dot density of present resolution is taken into consideration to carry out a printing operation, the printing quality is improved.

It is to be understood that the invention is not restricted to the particular forms shown in the foregoing embodiment. Various modifications and alterations can be made thereto without departing from the scope of the invention encompassed by the appended claims. For example, the same effect as the above-explained embodiment can be obtained with other types of printers such as thermal printers, although a laser printer has been used for explaining the embodiment.

What is claimed is:

1. A printing apparatus capable of printing image dots for character data with a plurality of printing resolutions, comprising:

receiving means for receiving dot information according to an image input from a host computer;

first storing means for storing the dot information received by said receiving means;

printing resolution selection means for selecting one from the plurality of printing resolutions, an image dot formed with one printing resolution being different in size from an image dot formed with another printing resolution;

second storing means for storing a set of smoothing interpolation data for each printing resolution of the plurality of printing resolutions, respectively, a dot set by one set of smoothing interpolation data being different in size from a dot set by another set of smoothing interpolation data;

selecting means for selecting the set of smoothing interpolation data according to the printing resolution selected by said printing resolution selection means;

interpolation dot information generating means for generating smoothing interpolation dot information from the set of smoothing interpolation data selected by said selecting means from the sets of smoothing interpolation data stored in said second storing means; and image data output means for outputting image data based on the dot information stored in said first storing means and the smoothing interpolation dot information generated by said interpolation dot information generating means.

2. The printing apparatus as claimed in claim 1, wherein said interpolation dot information generating means further comprises determination means for determining whether smoothing interpolation dot information needs to be generated, wherein said interpolation dot information generating means is executed in accordance with the determination of said determination means.

3. The printing apparatus as claimed in claim 2, wherein said determination means determines a need for smoothing interpolation dot information on a basis of the dot information stored in said first storing means and the selected set of smoothing interpolation data of the plurality of sets of smoothing interpolation data.

4. The printing apparatus as claimed in claim 1, wherein the dot information is generated from character codes based on the image input from the host computer.

5. A method of printing image dots for character data using one of a plurality of printing resolutions, comprising the steps of:

storing a set of edge smoothing interpolation data for each printing resolution of the plurality of printing resolutions in a first storing means of a print apparatus, a dot set by one set of edge smoothing interpolation data being different in size from a dot set by another set of edge smoothing interpolation data;

inputting dot information to be printed into a second storing means;

selecting one printing resolution from the plurality of printing resolutions, an image dot formed with one printing resolution being different in size from an image dot formed with another printing resolution;

selecting one set of edge smoothing interpolation data according to the printing resolution selected;

generating interpolation dot data on a basis of the set of edge smoothing interpolation data selected during said interpolation data selecting step from the plurality of sets of edge smoothing interpolation data stored in said first storing means;

outputting image data based on the dot information stored in said second storing means and the generated interpolation dot information; and providing the output image data as input data to a print engine.

6. The method as claimed in claim 5, further comprising the step of printing the dot data.

7. The method as claimed in claim 5, wherein the stored plurality of print resolutions are 300 dpi and 600 dpi.

8. The method as claimed in claim 7, further comprising the step of setting the print apparatus up for printing at 600 dpi.

9. The method as claimed in claim 8, wherein the print apparatus is a laser printer and setting up the print apparatus entails using an appropriate photosensitive drum and toner.

10. The method as claimed in claim 4, wherein the dot information is generated from character codes based on an image input from a host computer.

11. A print apparatus for printing image dots for character data using one of a plurality of printing resolutions, comprising:

first storing means in the print apparatus for storing a plurality of sets of edge smoothing interpolation data corresponding to the plurality of printing resolutions, a dot set by one set of edge smoothing interpolation data being different in size from a dot set by another set of edge smoothing interpolation data;

means for inputting data to be printed;

second storing means for storing dot data of the input data to be printed;

printing resolution selection means for selecting one printing resolution from the plurality of printing resolutions, an image dot formed with one printing resolution being different in size from an image dot formed with another printing resolution;

selecting means for selecting one set of edge smoothing interpolation data stored in said first storing means according to the printing resolution selected;

means for generating edge smoothing interpolation dot data on a basis of the set of edge smoothing interpolation data selected by said selecting means;

image data output means for outputting image data based on the dot information stored in said second storing means and the edge smoothing interpolation dot information generated by said interpolation dot information generating means; and means for providing the output image data as input data to a print engine.

12. The print apparatus as claimed in claim 11, wherein the print engine provides means for printing the dot data.

13. The print apparatus as claimed in claim 11, wherein the stored plurality of print resolutions are 300 dpi and 600 dpi.

14. The print apparatus as claimed in claim 13, further comprising means for setting the print apparatus up for printing at 600 dpi.

15. The print apparatus as claimed in claim 14, wherein the print apparatus is a laser printer and the means for setting the print apparatus up comprise an appropriate photosensitive drum and toner.

16. The print apparatus as claimed in claim 11, wherein the dot data are generated from character codes based on an image input from a host computer.

\* \* \* \* \*